(12) United States Patent
Royer

(10) Patent No.: US 10,504,327 B2
(45) Date of Patent: Dec. 10, 2019

(54) REAL-TIME SUPPLEMENTAL GAMING SYSTEM

(71) Applicant: Kevin Royer, Houston, TX (US)

(72) Inventor: Kevin Royer, Houston, TX (US)

( * ) Notice: Subject to any disclaimer, the term of this patent is extended or adjusted under 35 U.S.C. 154(b) by 0 days.

(21) Appl. No.: 15/836,251

(22) Filed: Dec. 8, 2017

(65) Prior Publication Data
US 2019/0035218 A1 Jan. 31, 2019

Related U.S. Application Data

(60) Provisional application No. 62/432,858, filed on Dec. 12, 2016.

(51) Int. Cl.
| | | |
|---|---|---|
| *A63F 13/828* | (2014.01) | |
| *G07F 17/32* | (2006.01) | |
| *A63F 13/65* | (2014.01) | |
| *A63F 13/46* | (2014.01) | |
| *A63F 13/58* | (2014.01) | |

(52) U.S. Cl.
CPC .......... *G07F 17/3258* (2013.01); *A63F 13/65* (2014.09); *A63F 13/828* (2014.09); *G07F 17/3288* (2013.01); *A63F 13/46* (2014.09); *A63F 13/58* (2014.09)

(58) Field of Classification Search
CPC ............. G07F 17/3258; G07F 17/3288; A63F 13/828; A63F 13/65; A63F 13/46; A63F 13/58
USPC .......................................................... 463/27
See application file for complete search history.

(56) References Cited

U.S. PATENT DOCUMENTS

| | | | | |
|---|---|---|---|---|
| 3,103,361 | A * | 9/1963 | Board ................. | A63F 3/00041 124/7 |
| 5,496,036 | A * | 3/1996 | Chester ............... | A63F 3/00041 273/247 |
| 6,287,199 | B1 * | 9/2001 | McKeown ............. | A63F 13/12 348/E7.071 |
| 7,334,796 | B2 * | 2/2008 | Wittwer .................... | A63F 3/00 273/244 |
| 8,187,065 | B1 * | 5/2012 | Poisson .................. | G06Q 30/00 463/4 |
| 2007/0082724 | A1 * | 4/2007 | Leis .......................... | A63F 1/00 463/16 |
| 2007/0278742 | A1 * | 12/2007 | Kroner ................ | A63F 3/00041 273/259 |
| 2011/0089638 | A1 * | 4/2011 | Thomopoulos ..... | A63F 3/00041 273/298 |

* cited by examiner

*Primary Examiner* — Allen Chan

(57) ABSTRACT

A gaming system to be played in real-time to supplement an actual sports game in which participants may strategize to predict the outcome and type of events that unfold in the actual sports game. Each participant is allotted a number of cards or selections which can be used at various times throughout the game to make such predictions. The real-time supplemental gaming system may be played over a variety of media; including, without limitation, board games, phone applications, web applications, and local network devices. Accordingly, a real-time supplemental gaming system is provided to award participants based on strategy rather than chance.

10 Claims, 5 Drawing Sheets

REAL-TIME SUPPLEMENTAL GAMING SYSTEM

CROSS-REFERENCE TO RELATED APPLICATIONS

This application claims the benefit of Provisional Patent Application Ser. No. 62/432,858, filed on Dec. 12, 2016, by the present inventor.

TECHNICAL FIELD

The present system relates generally to novelty games; and, in particular, to supplemental football games.

BACKGROUND

The following is a tabulation of some prior art that presently appears relevant:
United States Patent Application Nos. 2014/288,120 ("Ormsby"),
United States Patent Application Nos. 2012/807,075 ("Yumus"), and
United States Patent Application Nos. 2014/488,325 ("Belton");

The National Football League ("NFL") is big business. In 2016, Forbes estimated that the thirty-two NFL franchises have a combined value of approximately $74.8 billion. Due to the extreme popularity of the league, other markets and games—such as fantasy football—have emerged attempting to profit off of the in-game occurrences of the NFL. As such, Forbes values the fantasy football market around $70 billion, which approaches the combined value of all NFL franchises.

The rise and popularity of the markets and games supplemental to the actual NFL games is largely attributable to the unique social capabilities which sports, especially football, present. Moreover, such supplemental games offer football fans the opportunity to be invested in games they would otherwise overlook. As such, many football fans enjoy congregating at their local sports bar or in homes to watch games together; which, many times, results in attempts to predict the outcome of the game or even the next play or occurrence on the field. This social dynamic and ability to be invested in games is beneficial for the NFL, the fan, and the budding supplemental gaming industry.

Currently, the most dominant form of supplemental gaming on the market is fantasy football. However, since fantasy football is often an avenue for Internet gambling, this industry is heavily regulated by both federal and state laws. Such regulation has lead football fans to devise other methods for becoming more invested in the games. Such novelty devises include United States Patent Application Nos. 2014/288,120 ("Ormsby"), 2012/807,075 ("Yumus"), and 2014/488,325 ("Belton"); however, all such prior art devises appear to be limited in the ability to allow a participant to utilize coaching strategy and become invested on a play-by-play basis. Accordingly, a need exists for a supplemental gaming system which allows participants to think like a coach and utilize strategy to influence the outcome of the supplemental game rather than the outcome of the supplemental game being wholly reliant on the outcome of the actual sports game which is being played.

SUMMARY

The known supplemental gaming systems do not allow a participant to utilize strategy to influence the outcome of the supplemental game because they are wholly reliant on what happens on a field. As an analogy, the known supplemental gaming systems are more like roulette than poker: points are scored for the outcome of a play or drive rather than correctly predicting the type of play called on the field. One method of play allows a participant to put themselves in the mind of a coach and strategize, while the other method of play is completely result-dependent with no strategy.

In accordance with the present invention, the ability to offer more strategy and less chance in a supplemental gaming system is maximized through a supplemental gaming system which allows participants to predict the type of play called in addition to the outcome of such a play. Such a gaming system awards participants with the best strategies because—just like the primary games on which the supplemental games are based—strategy is more indicative of the outcome of a game rather than merely relying on chance.

In accordance with particular embodiments of the present invention, the supplemental gaming system may be played utilizing various methods; including, without limitation, a board game, a mobile phone application, a web application, an online league, or even on a local network within a restaurant, bar, or home.

DETAILED DESCRIPTION

As noted above, the known supplemental gaming systems rely entirely on chance rather than strategy. As an example, points are generally awarded in fantasy football based on how many yards or touchdowns a player has in a particular game—not the fact that the player may have been targeted for a pass multiple times throughout the game. Accordingly, a need exists for a supplemental gaming, system which allows participants to not only predict an outcome, but also predict the coach's strategy—in real-time—which yields such a favorable strategy.

Such a gaming system embodying the principles of the present invention could be scored multiple ways. In accordance with one embodiment of the present invention, two participants may participate in a head-to-head game. In such a game, each participant may receive multiple cards, calls, locks, or options (hereinafter, "card") prior to the start of a particular NFL game. Before the kickoff of the NFL game upon which the supplemental game is based, each participant picks a team to "manage" and may pick two "lock" selections: one for offense and one for defense. Such "lock" selections may be based on a certain outcome predicted by a player, such as a quarterback throwing for a certain amount of yards or a defense allowing fewer than a certain amount of yards. Given some "lock" selections may be done in secret, some participants may have picked the same "lock" selections. Prior to the start of the game, each player may be allotted "action" cards of identical type and quantity. As the NFL game progresses, each participant may play an "action" card to predict the type of and outcome of a certain play. If the participant correctly predicts the type of play and/or outcome of such a play, the participant may be awarded additional points. Additionally, participants may engage in "hot zone scoring," which starts when an offensive team in the NFL game reaches the certain yard line on the football field. At this point, participants may offer predictions for the outcome of the drive, such as a touchdown with a specific player, a field goal, or no points. In accordance with a particular embodiment of the present invention, scoring rules may be adjusted based on the version of the game being played. Offensive plays may comprise center run, end run, short pass, long pass, punt, field goal, extra point, and kickoff; and defensive outcomes may comprise a gain or loss of yardage, penalty, fumble with turn-over, fumble without turn-over, incomplete pass, quarterback sacked, punt, maximum yardage for field goal good, extra point, and kickoff yardage. Locks can be any combination of offensive or defensive plays.

In accordance with a supplemental gaming system embodying the principles of the present invention, the supplemental gaming system may be played by two or more participants. Additionally, the two or more participants may choose to "manage" each opposing team in the NFL game or the same team. However, since each game must result in a winner, rules may change if more than one participant chooses to "manage" the same team. As an example in accordance with the embodiments of the present invention, if three participants are playing and "managing" the same team, the "lock" and "hot zone scoring" selections for each team may be the same selections or may be different selections. Further, as an example in accordance with the embodiments of the present invention, a game which includes a higher number of participants may see the same "lock" and "hot zone scoring" selections due to the limited quantity of such selections. Additionally, for multi-participant playing, each participant may be matched with a participant "managing" an opposing team in the NFL game to face off in a head-to-head matchup in one half of the NFL game. At halftime of the NFL game, and in accordance with the embodiments of the present invention, the matchups may be rearranged so the highest-scoring participant "managing" a certain team will have to face the highest-scoring participant "managing" the opposing team to increase competition throughout the second half of the NFL game. If the game features an uneven number of participants, the scoring system may be manipulated to where a certain group of participants utilize head-to-head scoring while the remaining participants utilize a special "individual scoring" system.

The foregoing merely illustrates the principles of the invention. For example, although the supplemental game system incorporates certain scenarios on which participants may score points, it may be possible to provide additional scenarios on which participants may score points, which further increases the strategy used to play the game. Thus, it will be appreciated that those skilled in the art will be able to devise numerous alternative arrangements that, while not shown or described particularly herein, embody the principles of the invention and thus are within its spirit and scope.

DRAWING FIGURES

Figure 1:
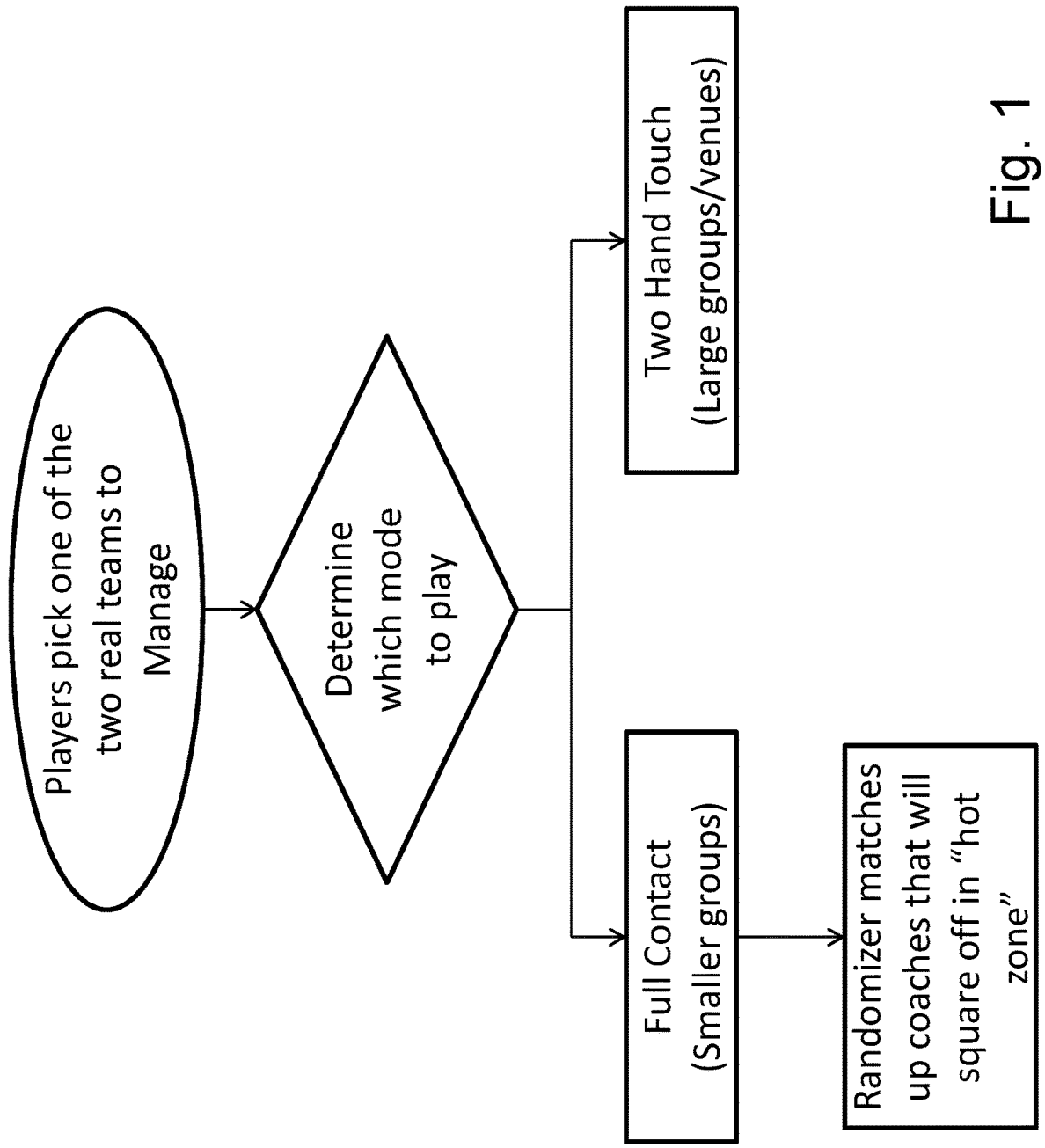
FIG. 1 is a sample flow chart of selection mode of play.
Figure 2:
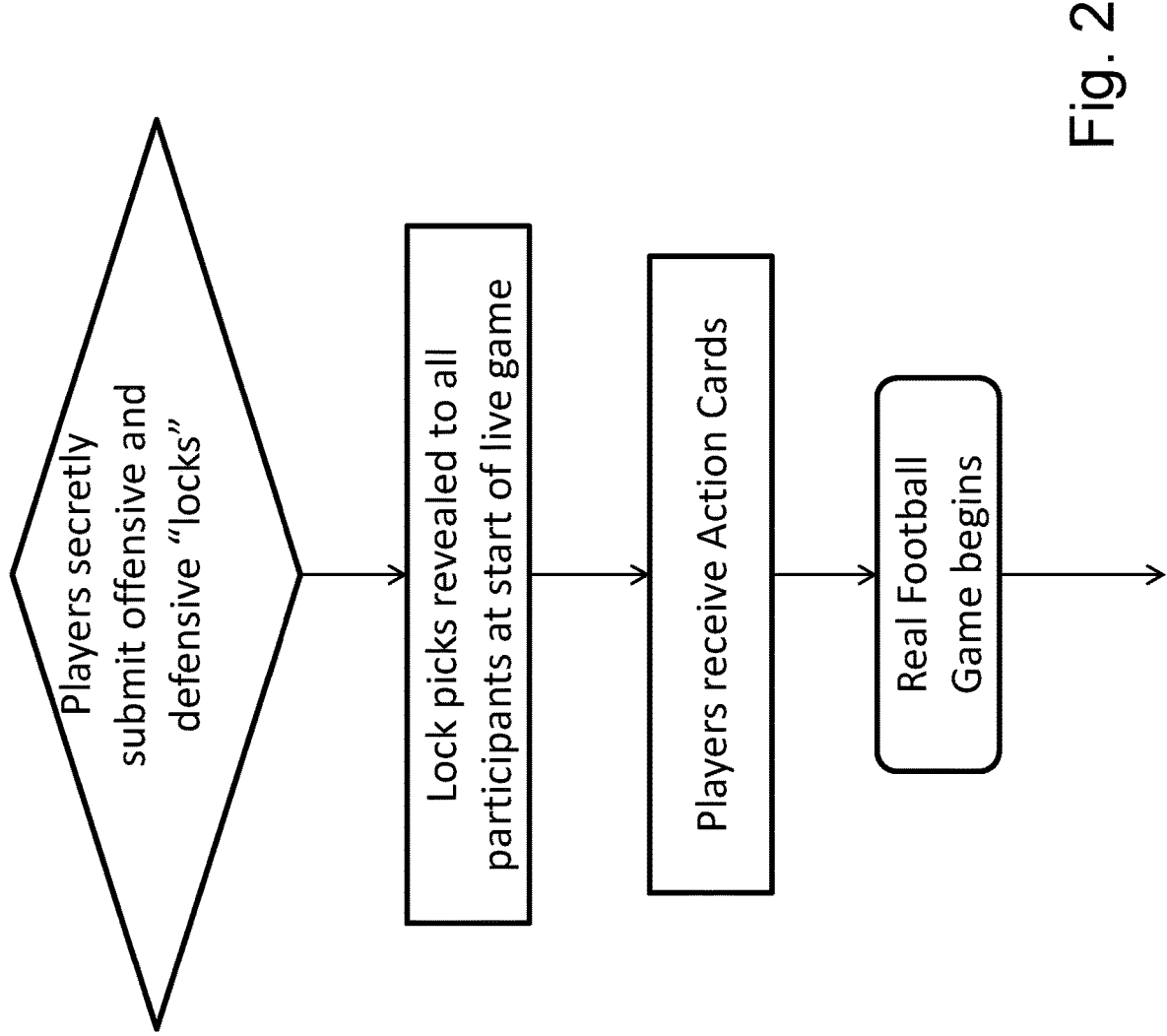
FIG. 2 is a sample flow chart of selection offensive and defensive locks.
Figure 3:
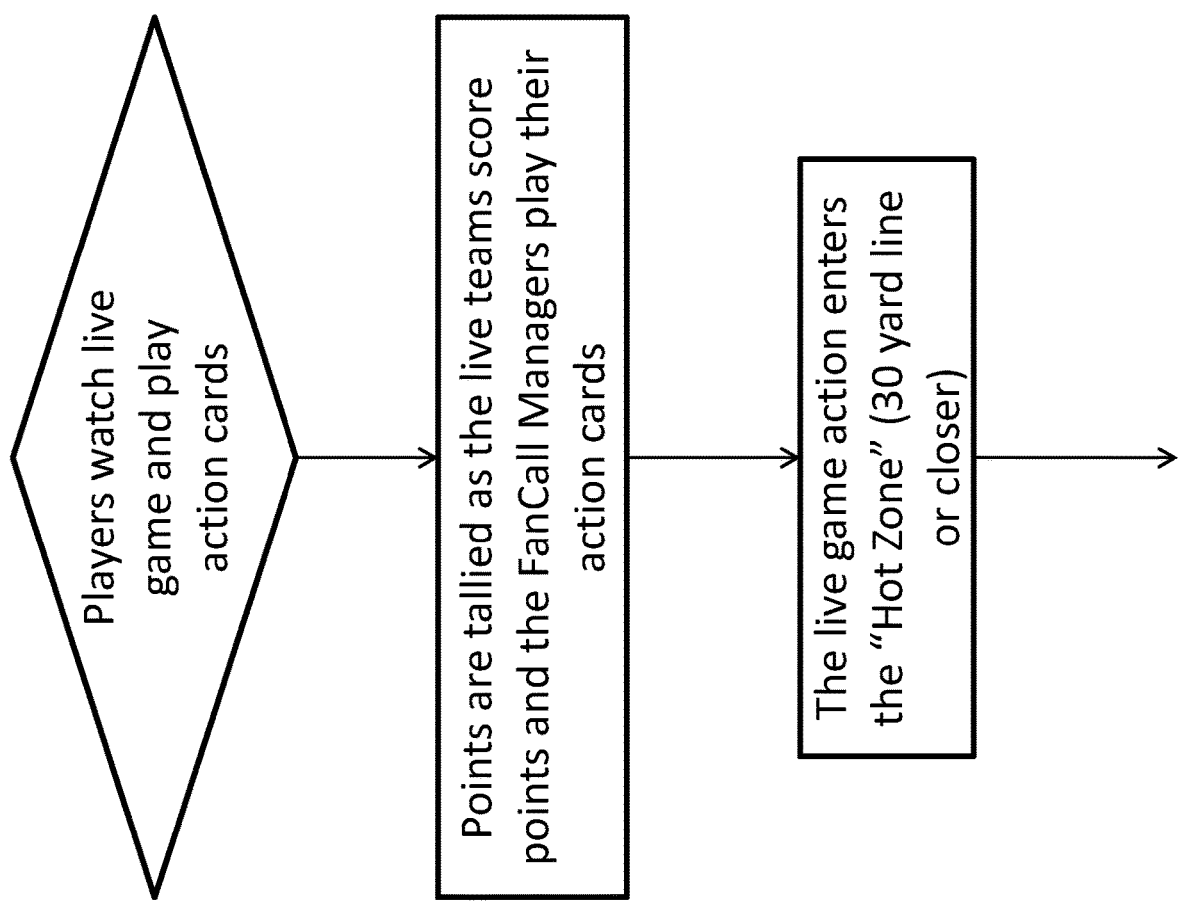
FIG. 3 is a sample flow chart which logically following FIG. 2, showing what occurs after the live game commences.
Figure 4:
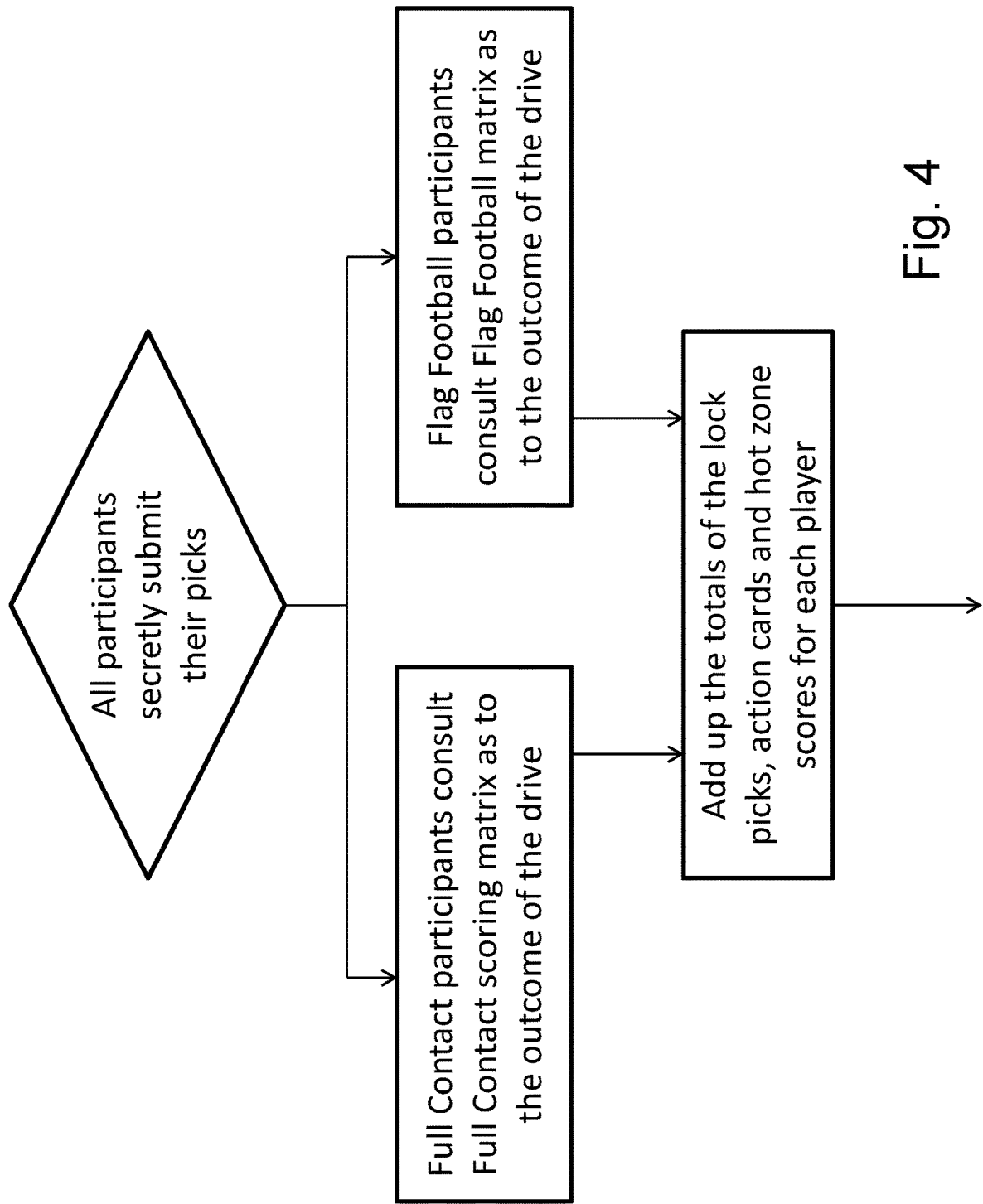
FIG. 4 is a sample flow chart which logically following FIG. 3, showing pick submissions and scoring based on applicable matrix.
Figure 5:
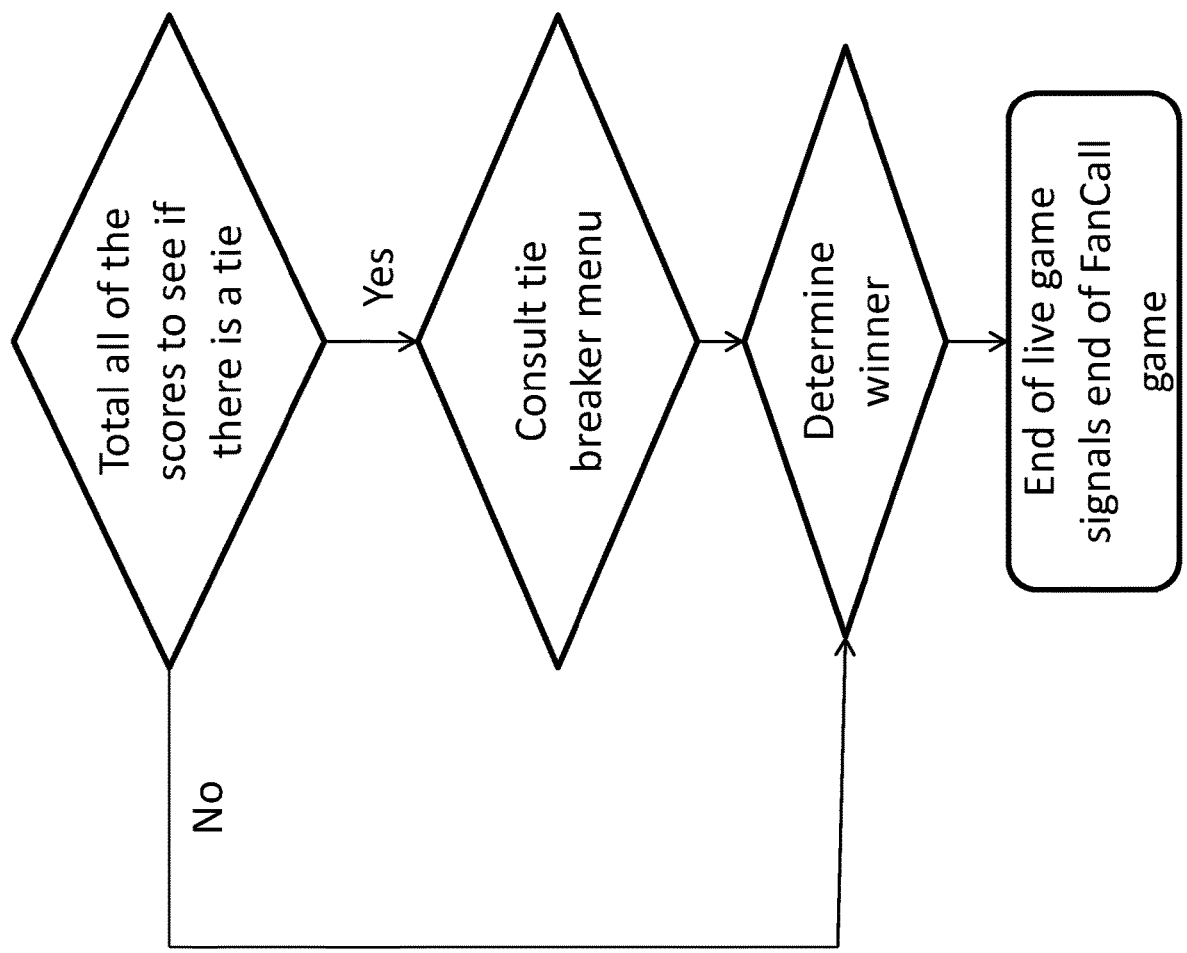
FIG. 5 is a sample flow chart which logically following FIG. 4, showing final resolution of scoring for determination of winner.

The invention claimed is:

1. A real time football gaming system, comprising: a live football game broadcast; at least one or more players; a player chosen team, player chosen action cards, each action card including offensive or defensive calls or options; player chosen locks from a menu, each lock predicting certain offensive or defensive outcomes during game play, where each of said action cards and locks can be played in any order during the course of game play;
   wherein said action cards are selected in advance by each player prior to the start of a live football game broadcast for play during said live football game broadcast to predict the outcome of a specific play; and
   wherein said locks are selected in advance by each player prior to the start of a live football game broadcast for play during said live football game broadcast to predict the outcome of a specific play.

2. The game of claim 1, wherein the highest-scoring player managing said player chosen team is required to faceoff against the highest-scoring participant managing the opposing player chosen team throughout the second half of said live football game.

3. The game of claim 1, wherein said action cards only includes the offensive plays and the defensive outcomes.

4. The game of claim 1, wherein said lock only includes the offensive plays and the defensive outcomes.

5. The game of claim 1, wherein players introduce hot-zone scoring offensive predictions during a live football game broadcast at pre-determined yard lines.

6. The game of claim 1, wherein players introduce hot-zone scoring-defensive predictions during a live football game broadcast at pre-determined yard lines.

7. The game of claim 1, wherein players optionally
   choose to manage a particular team during a live football game broadcast, and therefore all players' action cards and lock selections must be played for such team management.

8. The game of claim 1, wherein players optionally choose to manage a particular team during said live football game broadcast, and therefore all players' action cards and lock selections must be played for such team management, and at half-time during a live football game broadcast the managed teams will change based on point scoring.

9. An online gaming system for playing real time football strategy game, the system comprising:
   a. a server with a processor;
   b. a network in communication with the server;
   c. at least one client device with at least one user interface in communication with the network, wherein the at least one client device has an input device, a display device, and a monetary acceptance feature; and
   d. a database in communication with the processor, the database comprising:
      i. an electronic deck of action cards comprising offensive play cards and defensive play cards chosen by the player for use during game lay;
      ii. an electronic deck of lock selections comprising offensive play cards and defensive play cards that are chosen by the player for use during game play game play;
      iii. Computer instructions for instructing the processor to designate a football offense player and a football defense player;
      iv. Computer instructions for instructing the processor to permit defensive or offensive lock selections selection immediately before the start of a real time football game;
      v. Computer instructions for instructing the processor to permit defensive or offensive card playing immediately before the commencement of a down of a real time football game;

vi. Computer instructions for instructing the processor to electronically play said lock selections selected by a player at pre-determined downs of said real time football game; and vii. Computer instructions for instructing the processor to determine a game outcome and winner based on the action and lock selections played during game and actual results of said real time football game.

10. The online gaming system of claim 9, wherein the highest-scoring player managing said player chosen team is required to faceoff against the highest-scoring participant managing the opposing player chosen team throughout the second half of said live football game.

* * * * *